(12) United States Patent
Song et al.

(10) Patent No.: US 8,461,054 B2
(45) Date of Patent: Jun. 11, 2013

(54) METHOD OF MANUFACTURING LIQUID CRYSTAL DISPLAY DEVICE

(75) Inventors: Kye-Chan Song, Seoul (KR); Jeong Oh Kim, Seoul (KR); Young Kwon Kang, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 429 days.

(21) Appl. No.: 12/285,509

(22) Filed: Oct. 7, 2008

(65) Prior Publication Data
US 2009/0104724 A1 Apr. 23, 2009

(30) Foreign Application Priority Data
Oct. 8, 2007 (KR) .................. 10-2007-0101047

(51) Int. Cl.
*H01L 21/302* (2006.01)
*H01L 21/461* (2006.01)

(52) U.S. Cl.
USPC ............ 438/739; 438/30; 438/149; 438/151; 438/754; 438/947; 438/942; 438/943; 257/E21.036; 257/E21.038; 257/E21.233; 257/E21.235; 349/139; 349/141; 349/142; 349/146

(58) Field of Classification Search
USPC ............. 438/943, 30, 739, 717, 149, 151, 438/754, 942, 947; 257/E21.024, E21.033, 257/E21.036, E21.038, E21.039, E21.231, 257/E21.233, E21.235, E21.236; 216/13, 216/14, 15; 349/139, 141, 142, 146
See application file for complete search history.

(56) References Cited

U.S. PATENT DOCUMENTS

| | | | | |
|---|---|---|---|---|
| 6,420,097 B1* | 7/2002 | Pike et al. | ...... | 430/313 |
| 6,558,881 B2* | 5/2003 | Tokushima | ...... | 430/394 |
| 7,129,181 B2* | 10/2006 | Liu et al. | ...... | 438/739 |
| 7,532,273 B2* | 5/2009 | Paik et al. | ...... | 349/96 |
| 2003/0235790 A1* | 12/2003 | Chang | ...... | 430/313 |
| 2004/0252266 A1* | 12/2004 | Shimizu et al. | ...... | 349/139 |
| 2006/0094247 A1* | 5/2006 | Assal et al. | ...... | 438/735 |
| 2006/0141372 A1* | 6/2006 | Kobayashi | ...... | 430/5 |
| 2006/0146256 A1* | 7/2006 | Ahn | ...... | 349/141 |
| 2009/0233388 A1* | 9/2009 | Kwon et al. | ...... | 438/22 |

* cited by examiner

*Primary Examiner* — Kimberly Rizkallah
*Assistant Examiner* — Maria Ligai
(74) *Attorney, Agent, or Firm* — McKenna Long & Aldridge, LLP

(57) ABSTRACT

A method of manufacturing a liquid crystal display device which includes pixel electrodes and common electrodes which are alternatively arranged in each pixel defined on a substrate, including the steps of: forming a conductive film on the substrate; forming a mask layer, of which etching selection ratio is different from the conductive layer, on the conductive layer; forming a photo-resist pattern of a fixed pattern on the mask layer; forming a mask pattern, which has an undercut shape to the photo-resist pattern, by etching the mask layer by use of the photo-resist pattern as an etching mask; removing the photo-resist pattern; and etching the conductive film by use of the mask pattern as an etching mask, to provide at least any one of the common electrode and the pixel electrode.

12 Claims, 5 Drawing Sheets ately arranged by a fixed distance. Herein, when a data voltage is applied to the pixel electrode and a common voltage to the common electrode, a horizontal electric field in a horizontal direction to the substrate is formed. At this moment, the liquid crystal is driven by the horizontal electric field, thus it is possible to provide a good image in the characteristic of viewing angle, i.e., the viewing angle is symmetrical.
METHOD OF MANUFACTURING LIQUID CRYSTAL DISPLAY DEVICE This application claims priority under 35 U.S.C. 119 to Korean Patent Application No. 10-2007-101047, filed on Oct. 8, 2007, which is hereby incorporated by reference for all purposes as if fully set forth herein.

BACKGROUND OF THE INVENTION

1. Field of the Invention

The present invention relates to a liquid crystal display device, and more particularly to a manufacturing method of a liquid crystal display device adapted to improve a viewing angle, an aperture ratio, and a contrast ratio.

2. Discussion of the Related Art

Display devices have been developed greatly as information communication is developed, and are taking root as necessities to the moderns. A liquid crystal display device among these display devices is rapidly rising as a next generation display device because it consumes low power, has a fast response speed and small size.

The liquid crystal display device includes a light source and a liquid crystal panel. The light source provides light to the liquid crystal panel. The liquid crystal panel drives liquid crystal by use of electric fields. The liquid crystal display device displays a picture by controlling the transmittance of the light which is transmitted through the liquid crystal panel by driving the liquid crystal. At this moment, the liquid crystal has refractive index anisotropy, thus the liquid crystal display device has a narrow viewing angle.

In order to improve the viewing angle, the liquid crystal display device has a common electrode and pixel electrode which are bar-shaped and located on a pixel of substrate. The pixel electrode and the common electrode are alternately arranged by a fixed distance. Herein, when a data voltage is applied to the pixel electrode and a common voltage to the common electrode, a horizontal electric field in a horizontal direction to the substrate is formed. At this moment, the liquid crystal is driven by the horizontal electric field, thus it is possible to provide a good image in the characteristic of viewing angle, i.e., the viewing angle is symmetrical.

However, the horizontal electric field is formed in a separate space between the pixel electrode and the common electrode, but it is not formed in the upper part of the common electrode and the pixel electrode. Hereby, the liquid crystal disposed in the separate space is driven, but the liquid crystal disposed in the upper part of the common electrode and the upper part of the pixel electrode is not driven. Consequently, a light leakage in the upper part of the pixel electrode and in the upper part of the common electrode is generated, thus the contrast ratio is decreased and the aperture ratio is deteriorated.

Accordingly, the liquid crystal display device of the related art has a problem in that the contrast ratio and the aperture ratio deteriorate when the pixel electrode and the common electrode are disposed on the pixel for improving the viewing angle.

SUMMARY OF THE INVENTION

Accordingly, the present invention is directed to a manufacturing method of liquid crystal display device that substantially obviates one or more of the problems due to limitations and disadvantages of the related art.

An advantage of the present invention is to provide a manufacturing method of liquid crystal display device that is adaptive for improving a viewing angle, an aperture ratio, and a contrast ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a manufacturing method of a liquid crystal display device includes pixel electrodes and common electrodes which are alternatively arranged in each pixel defined on a substrate, includes the steps of: forming a conductive film on the substrate; forming a mask layer, of which etching selection ratio is different from the conductive layer, on the conductive layer; forming a photo-resist pattern of a fixed pattern on the mask layer; forming a mask pattern, which has an undercut shape to the photo-resist pattern, by etching the mask layer by use of the photo-resist pattern as an etching mask; removing the photo-resist pattern; and etching the conductive film by use of the mask pattern as an etching mask, to provide at least any one of the common electrode and the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1A:
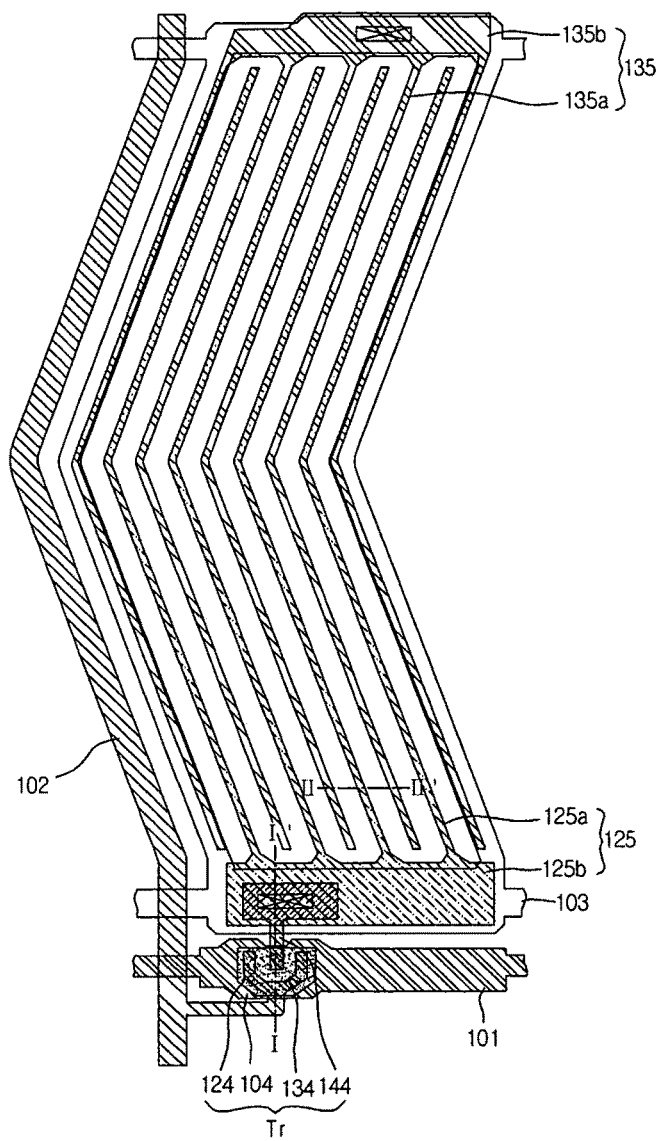
FIG. 1A is a plan view of a liquid crystal display device manufactured through methods according to embodiments of the present invention.

Reference will now be made in detail to the embodiments of the present invention, examples of which are illustrated in the accompanying drawings. Wherever possible, the same reference numbers will be used throughout the drawings to refer to the same or like parts.

The embodiments introduced hereinafter are provided as examples in order to convey the spirit of this invention to the ordinary skilled person in the art. Therefore, this invention might be embodied in a different shape, but not limited to the embodiments described here. Also, the size and thickness of the device might be expressed to be exaggerated for the sake of convenience in the drawings.

Figure 1B:
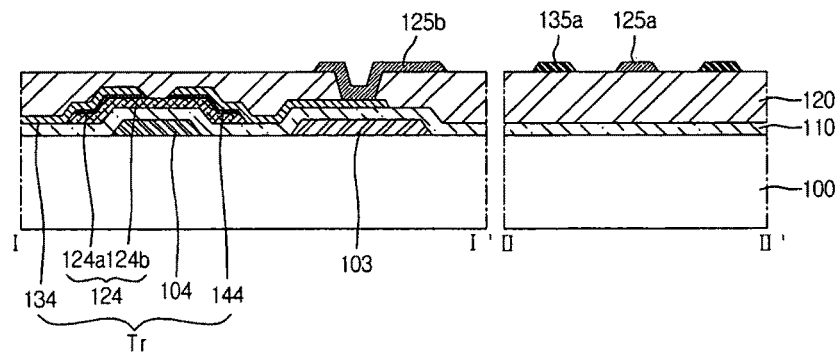
FIG. 1B is a cross sectional view of a liquid crystal display device taken along the line I-I' and II-II' in FIG. 1A.

FIGS. 1A and 1B are views for explaining a liquid crystal display device manufactured in accordance with a first embodiment of the present invention. FIG. 1A is a plan view of the liquid crystal display device manufactured through methods according to embodiments of the present invention, and FIG. 1B is a cross sectional view of the liquid crystal display device taken along the line I-I' and II-II' shown in FIG. 1A.

Referring to FIGS. 1A and 1B, the liquid crystal display device includes a plurality of pixels for displaying an image. Each pixel might be defined by a gate line 101 and a data line 102 which cross each other on a substrate 100. Herein, the gate line 101 and the date line 102 are insulated from each other by a gate insulation film 110 put therebetween. A common line 103 is disposed to be separate from the gate line 101. The common line 103 might be formed of the same conductive material as the gate line 101.

A thin film transistor Tr is disposed in each pixel. The thin film transistor Tr includes a gate electrode 104, a semiconductor pattern 124, a gate insulation film 110, a source electrode 134 and a drain electrode 144. Herein, the gate electrode 104 is electrically connected to the gate line 101. The source electrode 134 is electrically connected to the data line 102. Hereby, the thin film transistor Tr is electrically connected to the gate line 101 and the data line 102. Also, the semiconductor pattern 124 might include an active pattern 124a, and an ohmic contact pattern 124b put between the active pattern 124a and the source electrode 134 and between the active pattern 124a and the drain electrode 144.

A passivation film (or protection film) 120 is disposed on the substrate 100 including the thin film transistor Tr. The passivation film 120 might be formed of an insulation material.

A common electrode 135 and a pixel electrode 125 forming an electric field for driving liquid crystal are disposed in each pixel. The pixel electrode 125 might be formed of electric conductor through which light can be transmitted. For example, the pixel electrode 125 might be formed of ITO or IZO through which light can be transmitted. Differently from the drawing, the pixel electrode 125 might be formed integrally with the drain electrode 134.

The pixel electrode 125 might include first pixel electrodes 125a and second pixel electrodes 125b. The first pixel electrodes 125a are separated from each other by a fixed distance. The first pixel electrodes 125a might have a bar shape as well as a bent structure in order to differentiate domains. In this way, the pixel might be divided into domains which form electric fields of different directions to each other, thereby further improving the viewing angle. However, it is not limited to the fact that the pixel is divided into domains as in the first embodiment of the present invention.

The second pixel electrode 125b electrically connects the first pixel electrodes 125a. The second pixel electrode 125b might be integrated with the first pixel electrodes 125a. Part of the second pixel electrode 125b is electrically connected to the drain electrode 144 of the thin film transistor Tr. The second pixel electrode 125b might be overlapped with the common line 103 with an insulation film, e.g., a gate insulation film 110, and the passivation film 120 therebetween, thereby forming a storage capacitor.

The common electrode 135 might be formed of a transparent conductor through which light can be transmitted. The common electrode 135 includes first common electrodes 135a and second common electrodes 135b.

The first common electrodes 135a are alternately arranged with the first pixel electrodes 125a while maintaining a fixed distance. Hereby, the first common electrode 135a might have the same bent structure as the first pixel electrode 125a.

The second common electrode 135b is electrically connected to the first common electrodes 135a. The second common electrode 135b is electrically connected to the common line 103.

A horizontal electric field is formed between the first common electrode 135a and the first pixel electrode 125a when an electrical signal from the thin film transistor Tr is applied to the pixel electrode 125 and a common voltage is applied to the common electrode 135. Because no horizontal electric field is formed at the upper part of the first common electrode 135a and the first pixel electrode 125a, the first pixel electrode 125a and the first common electrode 135a have a fine line width not wider than 5 μm, thus the aperture ratio and the contrast ratio of the liquid crystal display device might be improved.

With reference to FIGS. 1A and 2A to 2E, a manufacturing method of a liquid crystal display device according to a first embodiment of the present invention will be now described. FIGS. 2A to 2E are cross sectional views of a liquid crystal display device taken along the line II-II' shown in FIG. 1a. In accordance therewith, in the embodiment of the present invention, the description for a process of forming a thin film transistor will be omitted.

Figure 2A:
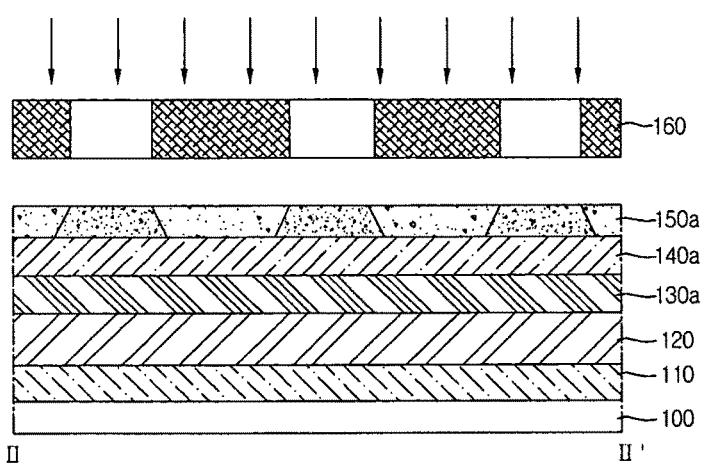
FIG. 2A to 2E are views explaining a manufacturing method of a liquid crystal display device according to a first embodiment of the present invention.

Referring to FIGS. 1A and 2A, the liquid crystal display device has a substrate 100 where a plurality of pixels are defined. The substrate 100 might have a data line 102 and a gate line 101 which define the pixel. Further, in each pixel, a thin film transistor Tr which is electrically connected to the data line 102 and the gate line 101 and a common line 103 which is separated from the gate line 101 might be arranged.

Sequentially, a conductive film 130a, a mask layer 140a and a photo-resist film 150a are formed on the substrate 100. The conductive film 130a might be formed by a chemical vapor deposition method. The conductive film 130a might be ITO or IZO.

The mask layer 140a might be formed of a material which has an etching selection ratio different from the conductive film 130a. In order to prevent the conductive film 130a from being damaged in an etching process of the mask layer 140a, the mask layer 140a should have a higher etching selection ratio than the conductive film 130a. For example, the mask layer 140a might be any one of SiNx, SiON and $SiO_2$. The mask layer 140a might be formed by the chemical vapor deposition method.

After providing an exposure mask 160 on the photo-resist film 150a, an exposure process where light is illuminated on the photo-resist film 150 through the exposure mask 160 is carried out.

Figure 2B:
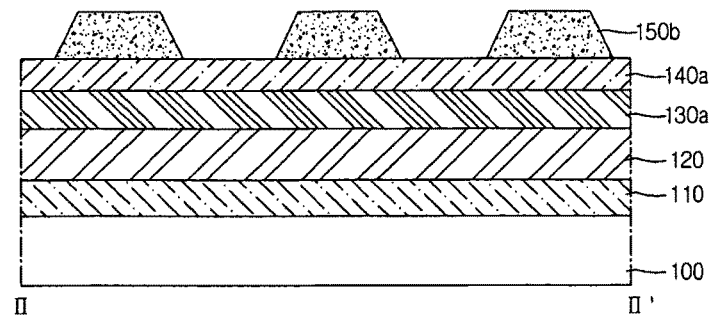

Referring to FIG. 2b, the exposed photo-resist film 150a is developed to form a photo-resist pattern 150b which has a fixed pattern. Currently, due to the technical limit of exposure equipment, it is not possible to form a photo-resist pattern 150b having a line width of not wider than 5 μm.

Figure 2C:
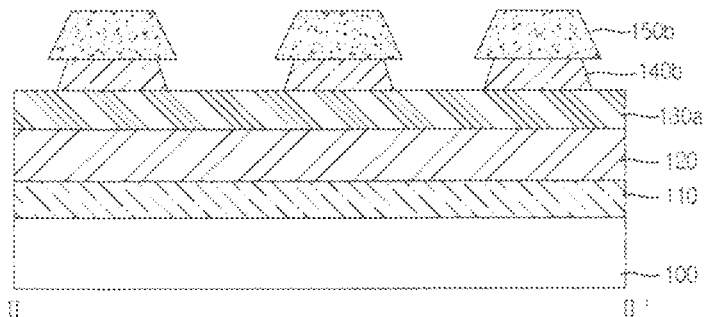

Referring to FIG. 2c, the mask layer 140a is etched by use of the photo-resist pattern 150 as an etching mask, thereby forming a mask pattern 140b. The mask layer 140a is etched by a dry etching method in order to prevent the conductive film 130 from being damaged.

Accordingly to a cross section of the mask pattern 140b which is formed by use of the photo-resist pattern 150b, the mask pattern 140b was confirmed to have an undercut shape when compared with the photo-resist pattern 150b. Hereby, the mask pattern 140b might have a narrow line width, i.e., around not wider than 3 μm, than the photo-resist pattern 150b.

Figure 2D:
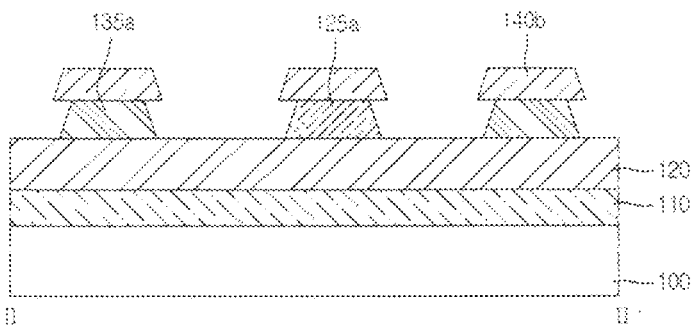

Referring to FIGS. 1A and 2D, after removing the photo-resist pattern 150b, the conductive film 130a is etched by use of the mask pattern 140b as an etching mask, thereby forming the common electrode 135 inclusive of the first common electrode 135a and the pixel electrode 125 inclusive of the first pixel electrode 125A. Herein, the pixel electrode 125 inclusive of the first pixel electrode 125a and the common electrode 135 inclusive of the first common electrode 135a have the undercut shapes in relation to the mask pattern 140b. Accordingly, the first pixel electrode 125a and the first common electrode 135a might have a narrow line width, i.e., a line width of not wider than 2 μm, than the mask pattern 140b.

Figure 2E:
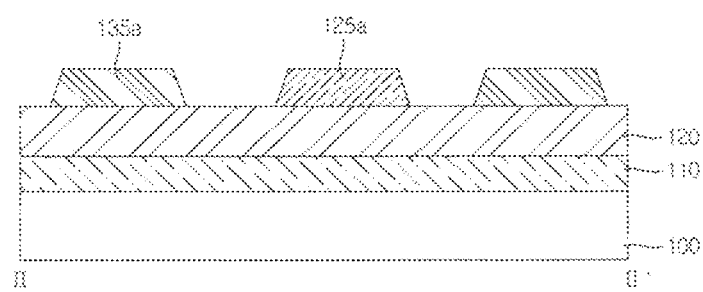
Figure 3:
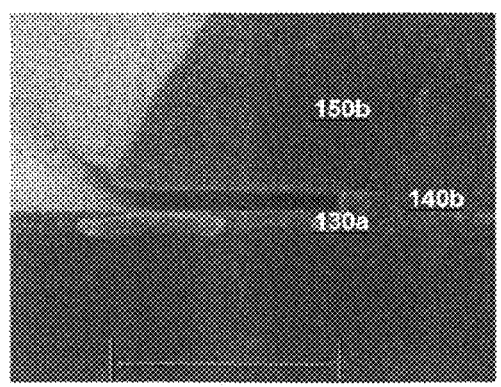
FIG. 3 is a photograph showing a cross section of a mask pattern 140b which is formed by use of a photo-resist pattern 150b.

Referring to FIGS. 1A and 2E, it is possible to form the first common electrode 135a and the first pixel electrode 125a which have a line width of not wider than 2 μm, than the mask pattern 140b by removing the mask pattern 140b. After then, the substrate 100 is bonded together with the upper substrate in such a manner to make the pixel electrode 125 face the common electrode, and a liquid crystal layer is formed between the substrate and the upper substrate, thereby enabling to fabricate the liquid crystal display device.

Hereby, the liquid crystal display device might improve the aperture ratio and the contrast ratio thereof by reducing the line width of the common electrode 135 and the pixel electrode 125 when fabricating the horizontal electric field type liquid crystal display device for improving the viewing angle.

Herein, the pixel electrode 125 and the common electrode 135 are explained to be formed by use of the same mask and the same conductive material, but it is not limited thereto. The pixel electrode might be formed by use of the same material as the drain electrode 144 of the thin film transistor Tr.

Figure 4A:
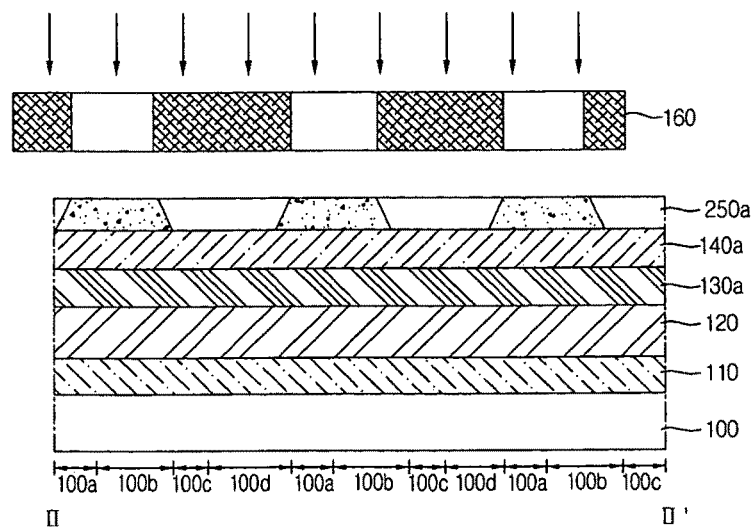
FIG. 4A to 4C are views explaining a manufacturing method of a liquid crystal display device according to a second embodiment of the present invention.
Figure 4B:
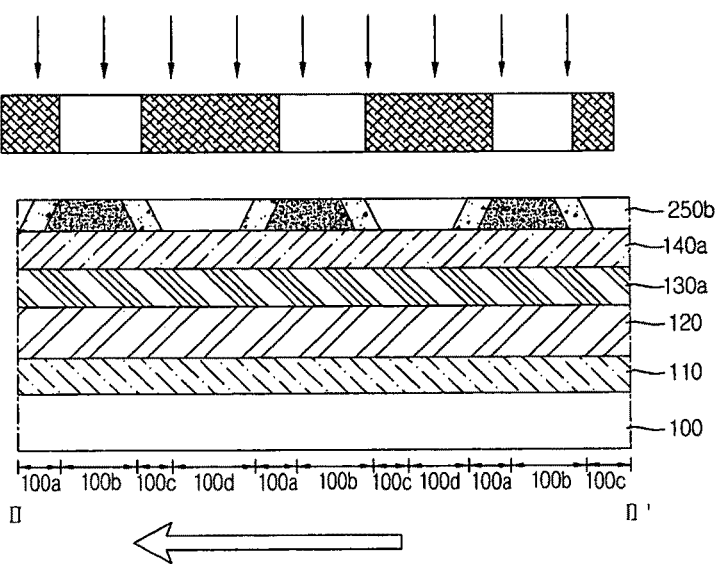
Figure 4C:
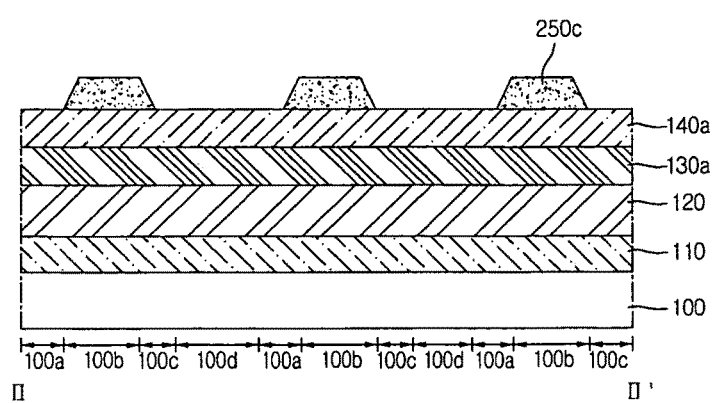

FIGS. 4A to 4C are views for explaining a manufacturing method of a liquid crystal display device according to a second embodiment of the present invention. FIGS. 4A to 4C are cross sectional views of a liquid crystal display device taken along the line II-II' shown in FIG. 1A. The second embodiment of the present invention has the same manufacturing processes as the first embodiment of the present invention described above, with the exception of a process of forming a photo-resist pattern 250c. Accordingly, the description of the first embodiment to be repeated in the second embodiment of the present invention will be omitted.

Referring to FIG. 4A, a conductive film 130a, a mask layer 140a and a photo-resist film are sequentially formed on the substrate.

The substrate where the photo-resist film is formed can be divided into first, second, third and fourth areas 100a, 100b, 100c, and 100d. The first photo-resist film might be formed of a negative type photo-resist resin.

An exposure mask 160 including a light transmission part and a light shielding part is provided on the photo-resist film. At this moment, the exposure mask 160 is aligned on the photo-resist film for the light transmission part to correspond to the first and second areas 100a and 100b.

After then, a first photo-resist film 250a is formed by performing a first exposure with a first exposure light amount onto the photo-resist film from the aligned exposure mask. In other words, the photo-resist film on the first and second areas 100a and 100b are exposed.

Referring to FIG. 4b, the substrate including the first photo-resist film 150a is moved for the light transmission part of the exposure mask 160 to correspond to the second and third areas 100b and 100c. At this moment, the exposure mask 160 is fixed. In accordance therewith, it is possible to prevent the exposure mask 160 from being mis-aligned in the exposure equipment.

After then, a second photo-resist film 250b is formed by performing a second exposure with a second exposure light amount onto the first photo-resist film 250a from the exposure mask 160. Hereby, the second area 100b of the second photo-resist film 250b are exposed twice by the first and second exposures, and the first and third areas 100a and 100c are exposed only once by the first or second exposure, and a fourth area 100d is not exposed.

Referring to FIG. 4c, the second photo-resist film 250b is developed by a developing solution. At this moment, each of the first and second exposure light amounts is an exposure amount with which the photo-resist film cannot have resistance to the developing solution, and the amount of the repeated first and second exposure amounts is an exposure amount with which the photo-resist film can have resistance to the developing solution. For example, the first and second exposure amounts might each be 50% when the exposure amount with which the photo-resist film can have resistance to the developing solution. Accordingly, a photo-resist pattern 250c might be formed in an exposure area overlapped by the first and second exposure, i.e., only the second area 100b.

Also, the first exposure light amount should be the same as the second exposure light amount in order to make the formation of the photo-resist pattern 250c having uniform thickness and the control of the exposure light amount easier. Actually, if the first exposure light amount is the same as the second exposure light amount, the exposure process becomes easier because the first and second exposures might be made while keeping the setting of the exposure equipment.

In the related art, it was not possible to form the photo-resist pattern having the line width of not wider than 5 μm due to the limit of the exposure equipment. However, in the second embodiment of the present invention, it is possible to form the photo-resist pattern having a fine line width, i.e., the line width of not wider than 5 μm as part of the photo-resist film is exposed to overlap therewith.

The second embodiment of the present invention discloses that the photo-resist pattern is formed by use of the negative photo-resist resin, but is not limited thereto, and the photo-resist pattern might be formed of the positive photo-resist resin.

Actually, when the photo-resist pattern is formed of the positive photo-resist resin, the photo-resist pattern may be formed in an area which is not exposed by the first and second exposures, e.g., a fourth area 100d, in the development process. In this case, if the exposure light amount that the photo-resist film can be completely removed in the developing solution is 100%, each of the first and second exposure light amounts might have the exposure light amount of 100% with which the photo-resist film might be removed.

After then, the mask pattern 140b of an undercut shape to the photo-resist pattern is formed by etching the mask layer 140a by use of the photo-resist pattern. Then, the electrode of the undercut shape to the photo-resist pattern, e.g., at least any one of the pixel electrode and the common electrode, might be formed by etching the conductive film 130a by use of the mask pattern 140b.

In this manner, the photo-resist pattern is finely formed by the overlapping exposure, thereby it is possible to further reduce the line width of the common electrode and the pixel electrode. Accordingly, the aperture ratio and the contrast ratio of the liquid crystal display device might be further improved.

As described above, the manufacturing methods of LCD devices according to the embodiments of the present invention might form the pixel electrode and the common electrode by forming the mask pattern of the undercut shape to the photo-resist pattern and by etching the conductive film in the undercut shape to the mask pattern. Accordingly, the aperture ratio and the contrast ratio of the liquid crystal display device might be improved together with the viewing angle, because the pixel electrode and the common electrode which have a fine line width can be provided on the pixel.

Moreover, the photo-resist pattern is formed by performing at least the first and second exposure processes and by making at least part of the first and second exposure areas to be overlapped, thus the photo-resist pattern with fine line width can be formed. Accordingly, the line width of the pixel electrode and the common electrode can be further reduced, thus the aperture ratio and the contrast ratio of the liquid crystal display device can be further improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display device which includes pixel electrodes and common electrodes which are alternatively arranged in each pixel defined on a substrate, comprising the steps of:
   forming a conductive film, a mask layer and a photo-resist film on the substrate, the mask layer including an insulating material having an etching selection ratio higher than the conductive layer and the photo-resist film including first, second, third and fourth areas positioned in a direction;
   firstly exposing the first and second areas of the photo-resist film;
   secondly exposing the second and third areas of the photo-resist film to form a photo-resist pattern;
   forming a mask pattern having opposite side surfaces, the opposite side surfaces having undercut shapes that are inwardly dented from opposite side surfaces of the photo-resist pattern, by etching the mask layer by use of the photo-resist pattern as an etching mask;
   removing the photo-resist pattern; and
   etching the conductive film by use of the mask pattern as an etching mask, to form the common electrode and the pixel electrode, the common electrode and the pixel electrode each has opposite side surfaces, and the opposite side surfaces of at least one of the common electrode and the pixel electrode having undercut shapes that are inwardly dented from the opposite side surfaces of the mask pattern.

2. The method claimed as claim 1, wherein the etching of the mask layer is performed by a dry etching process.

3. The method according to claim 1, wherein the etching of the conductive film is performed by a wet etching process to form at least any one of the common electrode and the pixel electrode which have an undercut shape to the mask pattern.

4. The method according to claim 1, further comprising:
   removing the photo-resist pattern corresponding to the first, third and fourth areas by developing the photo-resist film.

5. The method according to claim 4, wherein the first and second exposures are made by use of the same exposure mask.

6. The method according to claim 5, further comprising the step of:
   moving the substrate inclusive of the photo-resist film and making a light transmission part of the exposure mask to correspond to the second and third areas, between the firstly and secondly exposing steps.

7. The method according to claim 4, wherein the photo-resist pattern of the second area firstly and secondly exposed by light remains.

8. The method according to claim 4, wherein the photo-resist pattern having the first area firstly exposed by light, the third area secondly exposed by light and the fourth area firstly and secondly not exposed by light is removed.

9. The method claimed as claim 1, wherein the insulating material of the mask layer includes at least one of $SiN_x$, SiON and $SiO_2$.

10. The method claimed as claim 1, wherein the photo-resist film is formed of a negative type photo-resist resin.

11. The method claimed as claim 1, wherein the fourth area is spaced apart from the first area.

12. The method claimed as claim 1, wherein the photo-resist pattern has substantially the same line width as that of the second area of the photo-resist film.

* * * * *